(12) United States Patent
Beers et al.

(10) Patent No.: US 11,702,348 B2
(45) Date of Patent: Jul. 18, 2023

(54) PURIFIED POTASSIUM HEXAFLUOROMANGANATE AND METHODS FOR PURIFYING POTASSIUM HEXAFLUOROMANGANATE

(71) Applicant: Current Lighting Solutions, LLC, East Cleveland, OH (US)

(72) Inventors: William Winder Beers, Chesterland, OH (US); James E. Murphy, Niskayuna, NY (US); John Matthew Root, East Cleveland, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 114 days.

(21) Appl. No.: 15/241,758

(22) Filed: Aug. 19, 2016

(65) Prior Publication Data

US 2018/0050923 A1 Feb. 22, 2018

(51) Int. Cl.
*C01G 45/06* (2006.01)
*C01G 45/00* (2006.01)
*C09K 11/61* (2006.01)

(52) U.S. Cl.
CPC ........... *C01G 45/06* (2013.01); *C01G 45/006* (2013.01); *C09K 11/616* (2013.01); *C01P 2006/80* (2013.01)

(58) Field of Classification Search
CPC .............................. C01G 45/006; C01G 45/06
See application file for complete search history.

(56) References Cited

U.S. PATENT DOCUMENTS

| | | | |
|---|---|---|---|
| 8,057,706 B1 | 11/2011 | Setlur et al. | |
| 8,252,613 B1 | 8/2012 | Lyons et al. | |
| 8,710,487 B2 | 4/2014 | Lyons et al. | |
| 8,906,724 B2 | 12/2014 | Murphy et al. | |
| 9,512,357 B2 | 12/2016 | Murphy | |
| 9,698,314 B2 | 7/2017 | Murphy et al. | |

(Continued)

FOREIGN PATENT DOCUMENTS

| | | |
|---|---|---|
| CN | 102159666 A | 8/2011 |
| CN | 102719242 A | 10/2012 |

(Continued)

OTHER PUBLICATIONS

Cox et al, Complex Fluorides.Part II: Studies on Fluoroferrates and on Hydrogen Bonding in Complex Fluorides, J. Chem. Soc. 1954, pp. 1798-1803 (Year: 1954).*

(Continued)

*Primary Examiner* — Anita Nassiri-Motlagh
(74) *Attorney, Agent, or Firm* — Buckley, Maschoff & Talwalkar LLC (57) ABSTRACT

A potassium hexafluoromanganate (K2MnF6) composition includes no more than six parts per million of each of one or more Group 13 elements, no more than 520 parts per million of one or more alkaline earth metals, no more than fourteen parts per million of one or more transition metals, and/or no more than forty parts per million of calcium. A method for providing this composition, as well as lighting apparatuses, backlight units, and electronic devices including phosphors formed from the composition also are provided.

3 Claims, 5 Drawing Sheets

(56) References Cited

U.S. PATENT DOCUMENTS

| | | | |
|---|---|---|---|
| 2004/0005255 A1* | 1/2004 | Green | B01D 9/0013 422/245.1 |
| 2006/0169998 A1 | 8/2006 | Radkov et al. | |
| 2007/0205712 A1 | 9/2007 | Radkov et al. | |
| 2012/0256126 A1 | 10/2012 | Jia | |
| 2015/0054400 A1 | 2/2015 | Murphy | |
| 2015/0076406 A1* | 3/2015 | Zhou | C09K 11/576 252/301.4 F |
| 2015/0166887 A1 | 6/2015 | Murphy et al. | |
| 2016/0093776 A1 | 3/2016 | Setlur et al. | |
| 2016/0115382 A1 | 4/2016 | Du et al. | |
| 2016/0347998 A1* | 12/2016 | Kaneyoshi | C09K 11/616 |
| 2018/0051207 A1 | 2/2018 | Porob et al. | |
| 2018/0163126 A1 | 6/2018 | Murphy et al. | |
| 2018/0265778 A1 | 9/2018 | Du et al. | |

FOREIGN PATENT DOCUMENTS

| | | |
|---|---|---|
| CN | 102827601 A | 12/2012 |
| DE | 544118 C | 2/1932 |
| GB | 1 360 690 A | 7/1974 |
| GB | 1360690 A | 7/1974 |
| JP | 2015212398 A | 11/2015 |
| KR | 20090040348 A | 4/2009 |
| KR | 101642882 B1 | 7/2016 |
| WO | 199213364 A1 | 8/1992 |
| WO | 2012015581 A1 | 2/2012 |
| WO | 2012128837 A1 | 9/2012 |
| WO | 20140152787 A1 | 9/2014 |
| WO | 2015115194 | 8/2015 |

OTHER PUBLICATIONS

Mazej et al, Novel Syntheses of Some Binary Fluorides: The role of Anhydrous Hydrogen Fluoride, Acta Chim. Slov. 1999, 46(2), pp. 229-238. (Year: 1999).*

Porob, D.G., et al., Red-emitting phosphors, processes and devices, GE co-pending Application No. 1093/CHE/2015, filed on Mar. 5, 2015.

Tang, F., et al., "A set of manganese ion activated fluoride phosphors (A2BF6:Mn4+, A= K, Na, B = Si, Ge, Ti): synthesis below 0° C. and efficient room-temperature photoluminescencet," Journal of Materials Chemistry C, Royal Society of chemistry, vol. 4, pp. 9561-9568 (2016).

International Invitation to Pay Additional Fees issued in connection with corresponding PCT Application No. PCT/US2017/042721 dated Oct. 17, 2017.

International Search Report and Written Opinion issued in connection with corresponding PCT Application No. PCT/US2017/042721 dated Dec. 11, 2017.

Murphy, J.E., et al., Colorstable red-emitting phosphors, GE co-pending U.S. Appl. No. 61/791,511, filed on Mar. 15, 2013.

James Edward Murphy et al., Mar. 15, 2013, U.S. Appl. No. 61/791,511.

James Edward Murphy et al., Mar. 13, 2014, U.S. Appl. No. 14/208,592.

James Edward Murphy et al., May 23, 2014, U.S. Appl. No. 14/285,746.

James Edward Murphy et al., Jun. 23, 2014, U.S. Appl. No. 14/311,624.

Digamber Gurudas Porob et al., Mar. 2, 2016, PCT/US2016/020438.

International Search Report and Written Opinion for related India application PCT/US2016/020438 dated Jun. 30, 2016; 70 pages.

Chinese Office Action for related application 201710706690.6, dated Nov. 19, 2018; 11 pages. (English translation not available).

Notice of Allowance dated May 13, 2021 which was issued in connection with Korean Application No. 10-2019-7007738 which was filed on Jul. 19, 2017.

Office Action dated Jun. 24, 2021 which was issued in connection with Malaysian Application No. PI2019000687 which was filed on Jul. 19, 2017.

Anant Setlur et al., Optimized Phosphors for Wite LED Light Engines (DE-EE-0003251) Final Report, available at http://www.osti.gov/scitech/servlets/purl/1090708 (unknown date, at least as early as Feb. 23, 2016).

G.C. Allen et al., Reinvestigation of The Electronic Spectrum of Potassium Hexafluoromanganate (IV), Inorg. Nucl. Chem. Letters, vol. 5, pp. 725-728 (1969).

The Emission of Hexafluoromanganates (IV), Spectrochemica Acta, vol. 26A, pp. 1341-1343 (1970).

* cited by examiner

PURIFIED POTASSIUM HEXAFLUOROMANGANATE AND METHODS FOR PURIFYING POTASSIUM HEXAFLUOROMANGANATE

BACKGROUND

Potassium hexafluoromanganate ($K_2MnF_6$) can be used to create phosphor materials such as manganese-doped potassium hexafluorosilicate ($K_2SiF_6$:Mn). The potassium hexafluoromanganate can be synthesized in several different ways, but these synthesizing processes can result in contaminants or impurities in the final material.

The contaminants or impurities in the synthesized potassium hexafluoromanganate can decrease the performance and reliability of phosphors that include manganese-doped potassium hexafluorosilicate created using the potassium hexafluoromanganate. For example, the presence of aluminum, calcium, chromium, copper, iron, sodium, nickel, and/or zirconium can decrease the luminescence of the phosphors that include manganese-doped potassium hexafluorosilicate created using the potassium hexafluoromanganate. While some existing processing methods may filter some of these impurities out of the potassium hexafluoromanganate, these methods do not remove all or substantially all of the impurities.

BRIEF DESCRIPTION

In one embodiment, a potassium hexafluoromanganate ($K_2MnF_6$) composition is provided. The composition includes no more than six parts per million of each of one or more Group 13 elements, no more than 520 parts per million of one or more alkaline earth metals, no more than fourteen parts per million of one or more transition metals, and/or no more than forty parts per million of calcium. Optionally, composition includes no more than three parts per million of each of one or more Group 13 elements, no more than 260 parts per million of one or more alkaline earth metals, no more than seven parts per million of one or more transition metals, and/or no more than twenty parts per million of calcium.

In one embodiment, a lighting apparatus is provided that includes a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, a backlight unit is provided that includes a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, an electronic device is provided that includes a backlight unit including a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, a method includes obtaining a first solution comprising potassium hexafluoromanganate ($K_2MnF_6$) and one or more impurities, filtering the first solution of the potassium hexafluoromanganate and the one or more impurities to form a filtrate, and separating the potassium hexafluoromanganate from the one or more impurities by crystallizing the filtrate.

BRIEF DESCRIPTION OF THE DRAWINGS

The subject matter described herein will be better understood from reading the following description of non-limiting embodiments, with reference to the attached drawings, wherein below.

DETAILED DESCRIPTION

The inventive subject matter described herein provides processes for purifying phosphor precursors by reducing or eliminating impurities from the precursors. This can result in higher quality phosphors being formed from the precursors. The phosphors formed from the precursors may be represented by the formula:

$$A_x[MF_y]:Mn^{4+} \quad (I)$$

where A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is the absolute value of the charge of the $[MF_y]$ ion; and y is 5, 6 or 7.

The phosphor precursor may be $K_2MnF_6$ (also referred to as PFM), which can be synthesized using a solid state reaction that utilizes a furnace and flowing fluorine. Fluorine gas is a strong oxidizing agent. The fluorine gas ($F_2$) may be used at an elevated temperature to oxidize $Mn^{2+}$ or $Mn^{3+}$ to $Mn^{4+}$ in the presence of KF or $KHF_2$ to synthesize the phosphor. Optionally, in situ generated fluorine gas may be used in an electrolysis setup using HF acid solution containing $Mn^{2+}$ or $Mn^{3+}$ with KF or $KHF_2$ to synthesize the phosphor. In another embodiment, the fluorine gas is bubbled into a suspension containing $Mn^{2+}$ or $Mn^{3+}$ with KF or $KHF_2$ in a HF acid solution. The fluorine gas oxidizes the Mn ions to $Mn^{4+}$ and to precipitate out as the phosphor precursor (e.g., PFM) due to the presence of potassium salts. This reaction may be represented as:

$$2KF(s)+MnF_2(s)+F_2(g) \rightarrow K_2MnF_6(s)$$

Optionally, an electrolysis precipitation reaction for synthesizing the precursor (e.g., potassium hexafluoromanganate) may be performed using the following reactions:

$$Mn^{2+} \rightarrow Mn^{4+}+2e^- \text{(Pt anode)}$$

$$MnF_4+2KF \rightarrow K_2MnF_6$$

The electrolysis synthesis process includes electrolyzing a reaction solution including a source of manganese, a source of M and a source of A, where A is Li, Na, K, Rb, Cs, or a combination thereof; and M is Si, Ge, Sn, Ti, Zr, Al, Ga, In, Sc, Hf, Y, La, Nb, Ta, Bi, Gd, or a combination thereof. The reaction solution can be prepared by mixing the constituents (e.g., the source of manganese, the source of M, and the source of A) in aqueous hydrofluoric acid. The electrolysis is carried out in an electrolytic cell by passing an electric current through the reaction solution.

A suitable source of manganese is a compound that directly provides a tetravalent manganese ($Mn^{4+}$) or can be converted to another compound to provide a tetravalent manganese ($Mn^{4+}$) in a solution with aqueous hydrofluoric acid. In some embodiments, the source of manganese is a compound that provides manganese in a divalent state ($Mn^{2+}$), a trivalent state ($Mn^{3+}$), a tetravalent state ($Mn^{4+}$), a pentavalent state ($Mn^{5+}$), a hexavalent state ($Mn^{6+}$) or combinations thereof. In some instances, the compound has manganese in mixed valance state. Examples of suitable sources of manganese include manganese (II) fluoride ($MnF_2$), manganese (III) fluoride ($MnF_3$), manganese (III) chloride ($MnCl_3$), manganese (II) chloride ($MnCl_2$) hydrate, manganese oxide ($MnO_2$) and a combination thereof. In particular embodiments, the source of manganese is $MnO_2$, $MnF_2$ or $MnF_3$. Other examples are manganese acetate, manganese carbonate and manganese nitrate.

This synthesis process allows use of a compound that has manganese in an oxidation state other than a tetravalent state. A compound providing manganese in a divalent state, a trivalent state, a pentavalent state, a hexavalent state or mixed valence state can be used as the starting material for the preparation of the phosphor of formula I. Most of these compounds are readily available and easy to handle because these are inert under ambient conditions. In some embodiments, manganese is in elemental form, that is, manganese metal can be used. In some embodiments, the starting material may be a compound that provides manganese in tetravalent state.

The source of A may be a salt, wherein the corresponding anion for $A^+$ is fluoride, chloride, acetate, chloride, oxalate, dihydrogen phosphate, or a combination thereof. Particularly, the anion is fluoride. Examples of suitable materials include KF, $KHF_2$, LiF, $LiHF_2$, NaF, $NaHF_2$, RbF, $RbHF_2$, CsF, $CsHF_2$, and combinations thereof. In particular embodiments, the anion is fluoride, and A includes K.

The source of M may be a compound that is soluble in hydrofluoric acid. As described previously, in some embodiments, the element M is Si, Ge, Ti or a combination thereof. In particular embodiments, M is Si. Examples of suitable sources of Si include $H_2SiF_6$, $A_2SiF_6$, $SiO_2$, $SiCl_4$, Si$(OAc)_4$, tetraethyl orthosilicate ($Si(OEt)_4$) and combinations thereof. One particular example of Si source is $H_2SiF_6$. Examples of suitable sources of Ge include $GeCl_4$, Ge$(OEt)_4$, Ge$(OPr)_4$, Ge$(OMe)_4$, $GeO_2$ and combinations thereof. Examples of suitable sources of Ti include $H_2TiF_6$, $A_2TiF_6$, $TiO_2$, $TiCl_4$, Ti$(OAc)_4$, Ti$(OEt)_4$ and combinations thereof. One particular example of Ti source is $H_2TiF_6$.

In some embodiments, the source of M and the source of A are simultaneously added with the source of manganese to the aqueous hydrofluoric acid to form the reaction solution. The reaction solution is subsequently electrolyzed as described herein.

The electrolysis can be carried out in an electrolytic cell having a positive electrode and a negative electrode. Any suitable electrically conductive material that is chemically stable in hydrofluoric acid can be used for electrodes. Some suitable metals for the electrodes are platinum (Pt), rhodium (Rh), gold (Au), or a combination thereof. In one embodiment, platinum electrodes are used. Some other embodiments include Pt-10% Rh. An example of a non-metal electrode is graphite. In one embodiment, a power supply is connected to the electrodes for passing a current of about 0.75 ampere at a voltage of about 3 volts to carry out electrolysis. The reaction solution may be continuously stirred during the electrolysis. After the completion of electrolysis, a suspension is achieved, which is filtered and then washed followed by drying to obtain the product in powder form.

However, the rates of addition of constituents, their addition times and addition orders, temperatures and reactant concentrations are not critical, and may be tuned to improve the performance of the resulting $Mn^{4+}$ doped phosphor for a particular application.

In some embodiments, a solution is first formed by dissolving the source of manganese in aqueous hydrofluoric acid. This manganese solution is first electrolyzed for a duration of time by passing an electric current through the solution to form an electrolyzed manganese solution. In some instances, the electrolysis of the manganese solution is carried out until manganese is obtained in trivalent state ($Mn^{2+}$ ions) that is generally identified by observing a red-brown solution. Then, suitable amounts of the source of M and the source of A are combined with the electrolyzed manganese solution to form a combined solution. This combined solution is further electrolyzed by passing an electric current through the solution, as described previously.

Concentration of the hydrofluoric acid in the aqueous solutions used in the process of the present invention typically ranges from about 20% w/w to about 70% w/w, particularly from about 40% w/w to about 55% w/w. Other acids may be included in the solution if desired, such as hexafluorosilicic acid ($H_2SiF_6$).

Optionally, the phosphor precursor can be obtained from the Bode Method, which includes the following solution-based precipitation reaction:

$$2KMnO_4 + 2KF + 10HF + 3H_2O_2 \rightarrow 2K_2MnF_6(s) + 8H_2O \text{ (1)} + 3O_2(g)$$

This synthesis process can include gradually adding a first solution that contains aqueous HF and a source of M and a second solution that contains a source of Mn to a reactor in the presence of a source of A. Volume of the product liquor in the reactor is maintained at an equilibrium level by discharging the product liquor at about the same rate that feed solutions are added to the reactor. Feed solutions include at least the first and second solutions, along with other solutions that may be added to the reactor before or during the discharging. In some embodiments, the feed solutions may be added to the reactor during an initial period when the reactor is filled to an equilibrium volume without discharging the product liquor. The equilibrium volume is the volume that remains constant while the product liquor is discharged, and is approximately equal to the amount of feed solutions that are added to the reactor in five minutes, particularly in three minutes, more particularly in two minutes, and even more particularly in one minute. The equilibrium volume may be less than 35% of the total volume of all feed solutions, particularly less than 25% of the total volume of all feed solutions, and more particularly less than 15% of the total volume of all feed solutions. In embodiments where the total amount of feed solution is about 1000 ml, the equilibrium volume may range from about 70-200 ml, particularly from about 100-150 ml. Volume of the product liquor remains constant from the time that discharging of the product liquor begins until the discharging is discontinued, or until addition of all feeds is complete or otherwise discontinued. After discharging has begun, the rate of discharge is approximately the same as the total rate of addition of all feeds into the reactor so that the volume of the product liquor remains approximately constant during the discharge period. In the context of the present invention, 'remains approximately constant' means that the volume of the product liquor varies less than about 50% over the time period when the product liquor is being discharged, particularly about 20%, and more particularly about 10%.

The reaction time (e.g., the length of the addition and discharge periods) is not critical. In some embodiments, it may range from about one hour to about two hours. In some embodiments, the feed rates may be set to produce about 10 g product per minute. The feed rate, discharge rate, and equilibrium volume may be chosen so that residence time of the product phosphor in the reactor ranges from about 5 seconds to about 10 minutes, particularly from about 30 seconds to about 5 minutes, more particularly about 30 seconds to about 2 minutes, even more particularly about one minute.

In some embodiments, the reactor may be precharged with a material selected from HF, a source of A, preformed particles of the $Mn^{2+}$ doped phosphor, or a combination thereof. A non-solvent or antisolvent for the phosphor product may also be included in the precharge. Suitable materials for the antisolvent include acetone, acetic acid, isopropanol, ethanol, methanol, acetonitrile, dimethyl formamide, or a combination thereof. Alternatively, the antisolvent may be included in any of the feed solutions, or in a separate feed solution without a source of M or Mn, particularly in a feed solution that includes a source of A without a source of M or Mn.

The synthesis process may reduce the amount of raw materials used to prepare the phosphors of formula I relative to one or more, or all, other synthesis processes for creating the phosphor. In particular, the amount of toxic materials such as HF used may be significantly reduced in comparison with a batch process. Where the amount of HF is reduced, the product liquor may contain a higher level of raw materials compared to a batch process. In many embodiments, the product liquor contains at least 10% dissolved solids, particularly at least 19% dissolved solids, after the start of the discharge. In addition, product yields may be higher compared batch processes. For example, product yield from processes according to the present invention may be as high as 85-95%, whereas yields from batch processes are typically in the range of 60%-75%.

The first solution includes aqueous HF and a source of M. The source of M may be a compound containing Si, having good in solubility in the solution, for example, $H_2SiF_6$, $Na_2SiF_6$, $(NH_4)_2SiF_6$, $Rb_2SiF_6$, $Cs_2SiF_6$, $SiO_2$ or a combination thereof, particularly $H_2SiF_6$. Use of $H_2SiF_6$ is advantageous because it has very high solubility in water, and it contains no alkali metal element as an impurity. The source of M may be a single compound or a combination of two or more compounds. The HF concentration in the first solution may be at least 25 wt %, particularly at least 30 wt %, more particularly at least 35 wt %. Water may be added to the first solution, reducing the concentration of HF, to decrease particle size and improve product yield. Concentration of the material used as the source of M may be ≤25 wt %, particularly ≤15 wt %.

The second solution includes a source of Mn, and may also include aqueous HF as a solvent. Suitable materials for use as the source of Mn include for example, $K_2MnF_6$, $KMnO_4$, $K_2MnCl_6$, $MnF_4$, $MnF_3$, $MnF_2$, $MnO_2$, and combinations thereof, and, in particular, $K_2MnF_6$. Concentration of the compound or compounds used as the source of Mn is not critical; and is typically limited by its solubility in the solution. The HF concentration in the second solution may be at least 20 wt %, particularly at least 40 wt %.

The first and second solutions are added to the reactor in the presence of a source of A while stirring the product liquor. Amounts of the raw materials used generally correspond to the desired composition, except that an excess of the source of A may be present. Flow rates may be adjusted so that the sources of M and Mn are added in a roughly stoichiometric ratio while the source of A is in excess of the stoichiometric amount. In many embodiments, the source of A is added in an amount ranging from about 150% to 300% molar excess, particularly from about 175% to 300% molar excess. For example, in Mn-doped $K_2SiF_6$, the stoichiometric amount of K required is 2 moles per mole of Mn-doped $K_2SiF_6$, and the amount of KF or $KHF_2$ used ranges from about 3.5 moles to about 6 moles of the product phosphor.

The source of A may be a single compound or a mixture of two or more compounds. Suitable materials include KF, $KHF_2$, KOH, KCl, KBr, KI, $KOCH_3$ or $K_2CO_3$, particularly KF and $KHF_2$, more particularly $KHF_2$. A source of Mn that contains K, such as $K_2MnF_6$, may be a K source, particularly in combination with KF or $KHF_2$. The source of A may be present in either or both of the first and second solutions, in a third solution added separately, in the reactor pot, or in a combination of one or more of these.

But, these synthesizing processes produce the phosphor precursor potassium hexafluoromanganate with unacceptable levels of impurities that result in a decrease in quality of a phosphor synthesized using the precursor. These levels of impurities can degrade performance of phosphors formed from the phosphor precursor. One or more embodiments of the inventive subject matter described herein remove the unwanted impurities to provide a purified potassium hexafluoromanganate by recrystallizing potassium hexafluoromanganate. The description herein provides multiple different methods for recrystallization, which include creating a highly saturated solution of potassium hexafluoromanganate in hydrofluoric acid. The saturated/nearly saturated solution is filtered to remove insoluble impurities before drastically reducing the solubility of the solution and crashing out the purified potassium hexafluoromanganate from the solution. The precipitation separates the potassium hexafluoromanganate from the rest of the solution, including the soluble impurities previously included in the potassium hexafluoromanganate prior to the recrystallization.

The recrystallization can be accomplished in a variety of manners. As one example, the recrystallization can be achieved by adding a large excess of potassium fluoride (KF) in hydrofluoric acid (HF) to the potassium hexafluoromanganate solution to decrease the solubility of the potassium hexafluoromanganate. Another example of the recrystallization includes saturating the potassium hexafluoromanganate in a solution at an elevated temperature and then rapidly cooling the solution to decrease the solubility of the potassium hexafluoromanganate (relative to the impurities). In another example, an antisolvent such as carboxylic acids, alcohols or ketones can be added to the saturated solution to decrease the solubility of the potassium hexafluoromanganate. Additionally or alternatively, a high concentration of hydrofluoric acid (e.g., 70%) may be added to the potassium hexafluoromanganate solution and the solubility of the potassium hexafluoromanganate in this solution may be decreased by adding water and/or an antisolvent to the solution. Optionally, a combination of two or more of these recrystallization methods may be used.

While the description herein focuses on purifying potassium hexafluoromanganate, other materials may be purified using one or more embodiments of the inventive subject matter described herein. For example, potassium fluoride-based materials represented by the formula $K_2[M_{1-a}Mn^{4+}{}_aF_6]$, where M is at least one selected from group IV elements of titanium (Ti), zirconium (Zr), and hafnium (Hf) and group IVB elements of silicon (Si), germanium (Ge), and tin (Sn), and where a has a value of greater than zero and less than 0.2, may be purified of impurities using one or more embodiments described herein.

Figure 1:
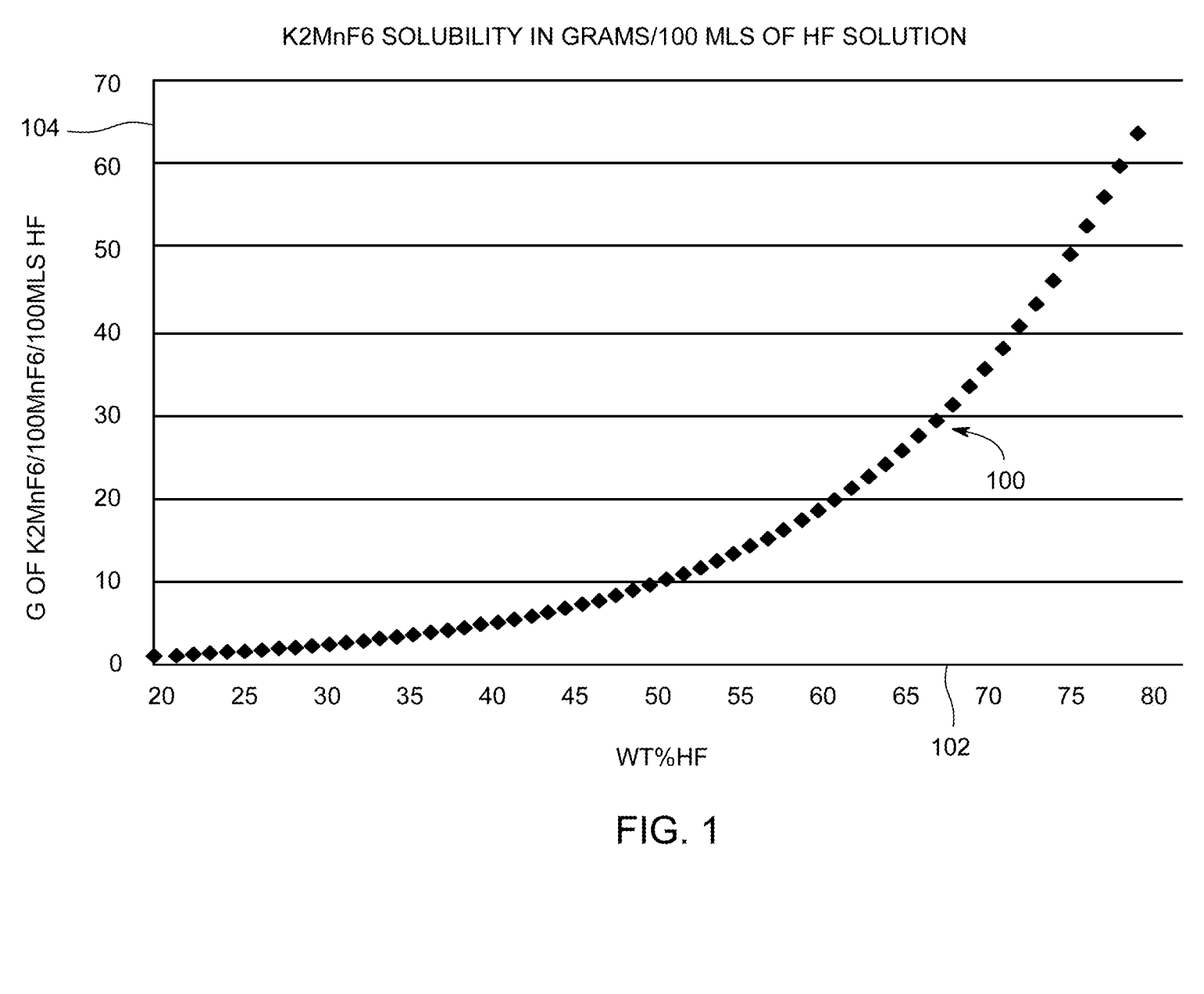
FIG. 1 illustrates solubility of potassium hexafluoromanganate in hydrofluoric acid according to one example.

FIG. 1 illustrates solubility 100 of potassium hexafluoromanganate in hydrofluoric acid according to one example. The solubility 100 of potassium hexafluoromanganate is shown alongside a horizontal axis 102 representative of weight percentage of hydrofluoric acid and a vertical axis 104 representative of grams of potassium hexafluoromanganate mixed in 100 milliliters of hydrofluoric acid. As shown in FIG. 1, the solubility 100 of potassium hexafluoromanganate in hydrofluoric acid significantly increases with increasing weight percentages of hydrofluoric acid in a solution. One or more examples of the recrystallization methods described herein are dependent upon the solubility 100 of potassium hexafluoromanganate in hydrofluoric acid. By filtering the nearly saturated potassium hexafluoromanganate/hydrofluoric acid solution, contaminants (including unreacted manganese fluoride) that have a low solubility in the hydrofluoric acid can be removed. By then decreasing the solubility of the potassium hexafluoromanganate/hydrofluoric acid solution, crashing out the potassium hexafluoromanganate, and separating the potassium hexafluoromanganate from the remaining solution, unwanted contaminants that were soluble in hydrofluoric acid but that did not precipitate out of the solution when the solubility 100 of the potassium hexafluoromanganate decreased can be removed from the potassium hexafluoromanganate.

Figure 2:
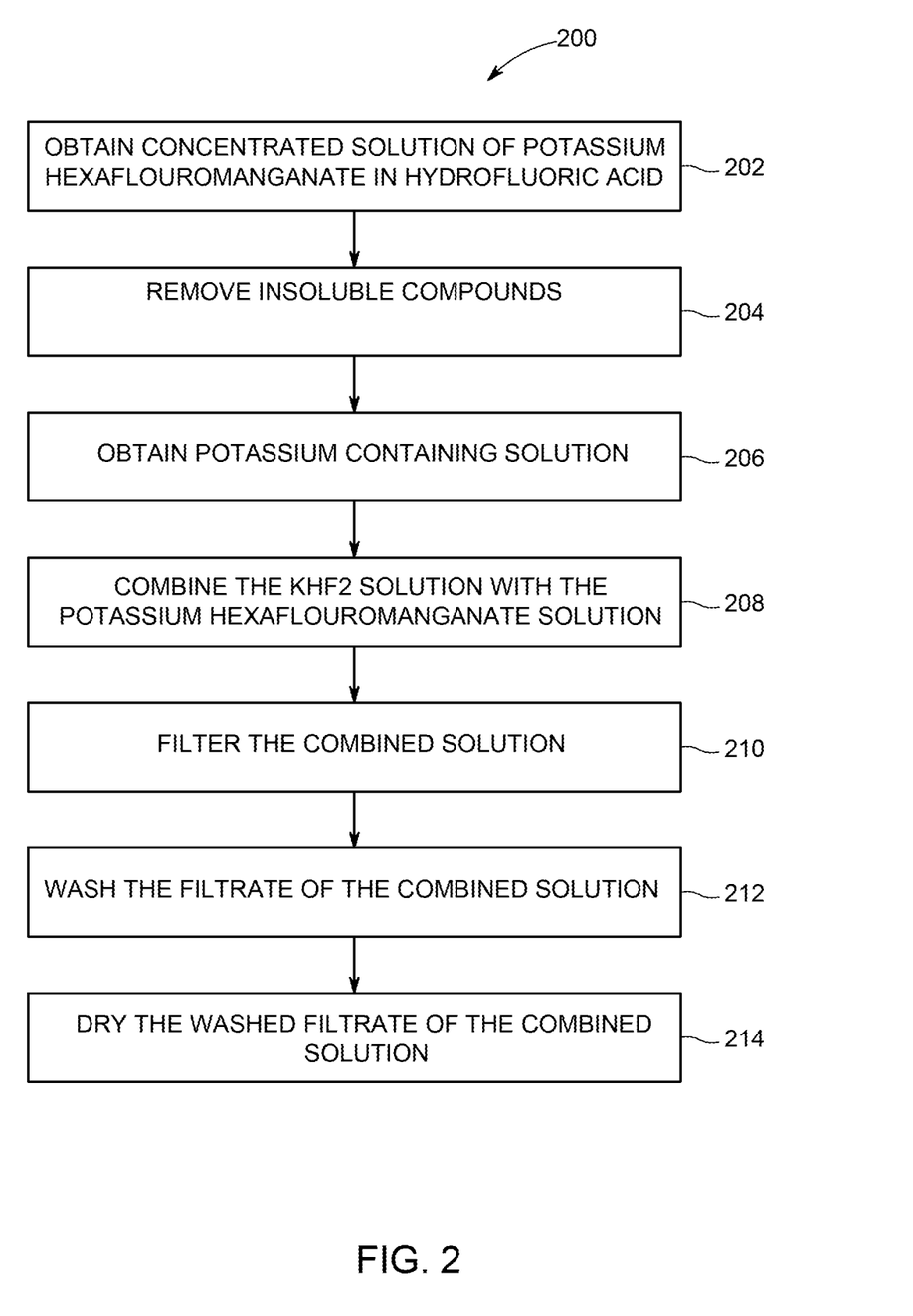
FIG. 2 illustrates a flowchart of one embodiment of a method for purifying potassium hexafluoromanganate.

FIG. 2 illustrates a flowchart of one embodiment of a method 200 for purifying potassium hexafluoromanganate. At 202, a solution of potassium hexafluoromanganate in hydrofluoric acid is obtained. The solution may be a concentrated solution of the potassium hexafluoromanganate in hydrofluoric acid. The potassium hexafluoromanganate includes one or more impurities, such as one or more Group 13 elements (e.g., boron, aluminum, gallium, indium, or titanium), one or more transition metals (e.g., iron, copper, chromium, zirconium, nickel, vanadium, platinum, cobalt, or titanium), or another impurity (e.g., vanadium, lithium, magnesium, or elements that have a significantly different solubility in the hydrofluoric acid solution than potassium hexafluoromanganate). This solution may be obtained by mixing an amount of the potassium hexafluoromanganate in the hydrofluoric acid that will be used to create one or more phosphors.

The potassium hexafluoromanganate that is mixed into the hydrofluoric acid may be obtained or created using one or more of a variety of different processes. In one embodiment, the potassium hexafluoromanganate may be formed using the Bode method for providing the potassium hexafluoromanganate, which includes reacting potassium permanganate ($KMnO_4$), potassium fluoride (KF) and/or potassium bifluoride ($KHF_2$), hydrofluoric acid (HF), and peroxide ($H_2O_2$), and precipitating the potassium hexafluoromanganate from this reaction. As another example, the potassium hexafluoromanganate may be obtained by reacting a combination of one or more of potassium fluoride (KF) or potassium bifluoride ($KHF_2$), manganese fluoride ($MnF_2$, $MnF_3$, and/or $MnF_4$), and a fluorinating agent such as fluorine. Optionally, the potassium hexafluoromanganate may be obtained by precipitating the potassium hexafluoromanganate using electrolysis.

Figure 3:
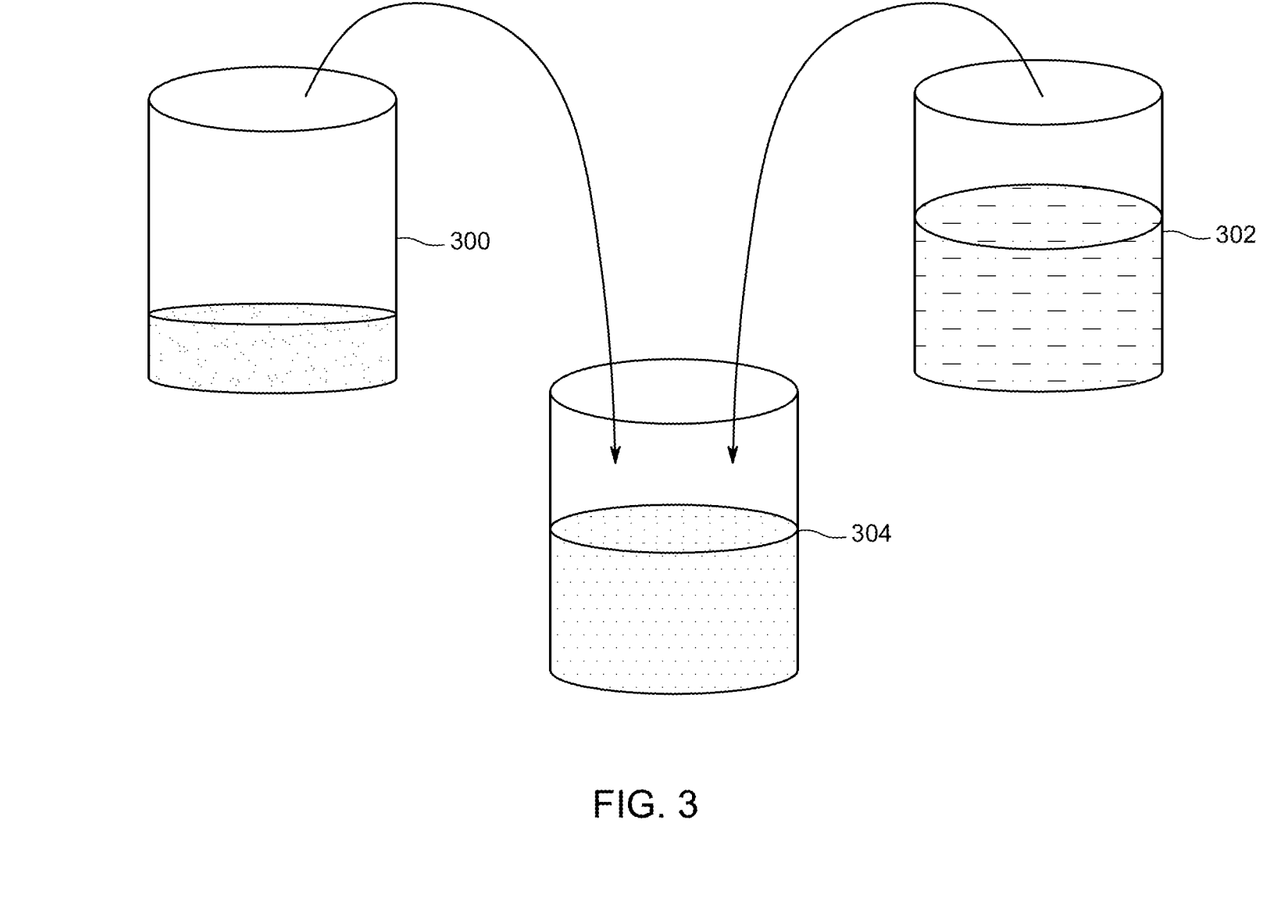
FIG. 3 illustrates mixing an amount of potassium hexafluoromanganate that is to be purified in hydrofluoric acid to form a concentrated solution.

FIG. 3 illustrates mixing an amount of potassium hexafluoromanganate 300 that is to be purified in hydrofluoric acid 302 to form a concentrated solution 304. In one embodiment, the volume of hydrofluoric acid 302 in which the potassium hexafluoromanganate 300 is mixed to form the solution 304 is four times (in milliliters) the weight of the potassium hexafluoromanganate (in grams). Alternatively, another amount of hydrofluoric acid and/or potassium hexafluoromanganate may be used. In one embodiment, ten grams of potassium hexafluoromanganate is dissolved in forty milliliters of 70% hydrofluoric acid (where the hydrofluoric acid is 70% by weight of water in which the hydrofluoric acid is mixed).

Figure 4:
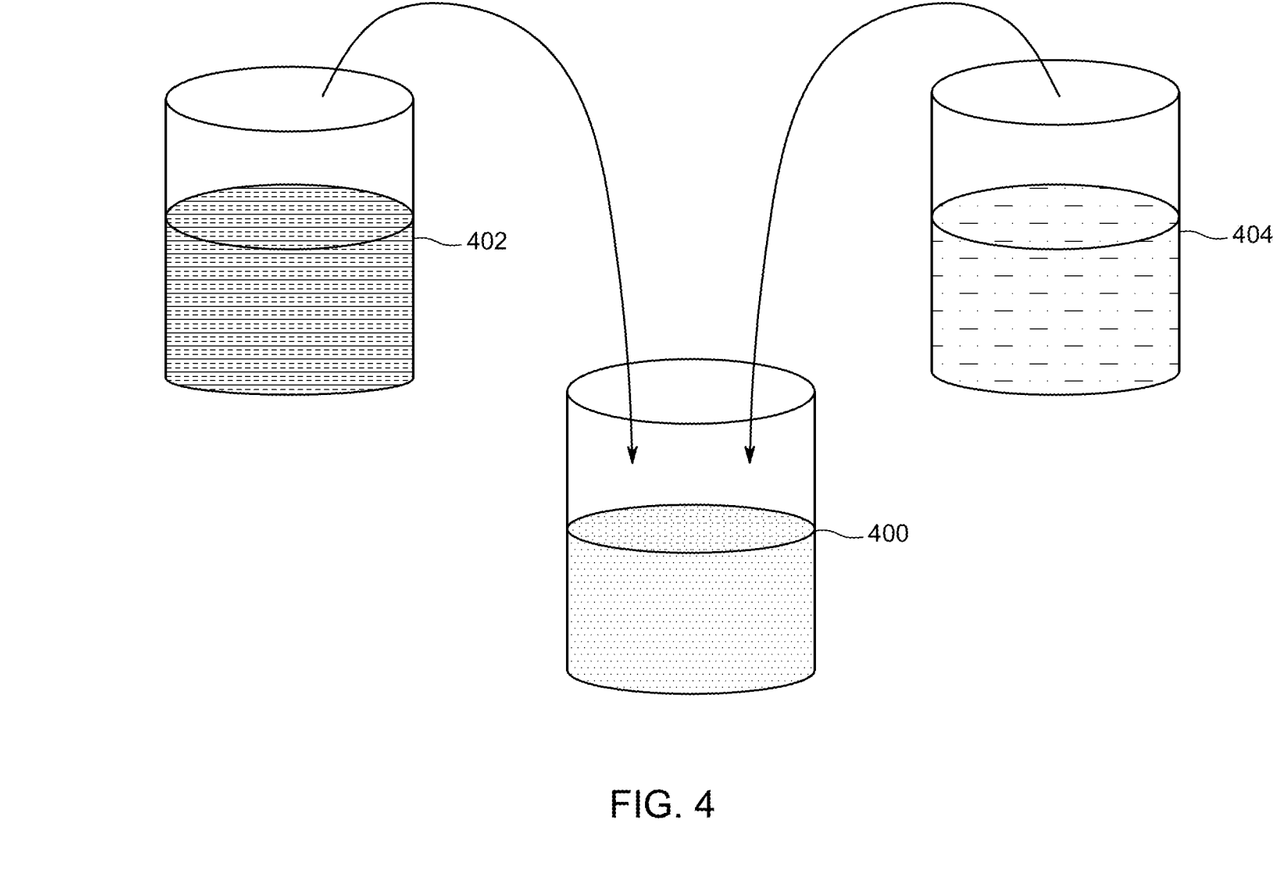
FIG. 4 illustrates formation of a solution of potassium bifluoride in hydrofluoric acid according to one embodiment.

At 204, manganese fluoride that is insoluble in the concentrated solution is removed. For example, the concentrated solution 304 may be vacuum filtered through a paper filter or other filter in order to obtain a filtrate. This filtering can remove insoluble manganese fluoride, such as manganese difluoride ($MnF_2$), from the concentrated solution. At 206, a potassium containing solution is obtained. This concentrated solution may be a solution of potassium fluoride (KF) in hydrofluoric acid, such as a potassium bifluoride ($KHF_2$) solution. FIG. 4 illustrates formation of a solution 400 of potassium bifluoride 402 in hydrofluoric acid 404 according to one embodiment. The hydrofluoric acid 404 may be 48% hydrofluoric acid by weight. Alternatively, another concentration of hydrofluoric acid may be used. The amount of potassium bifluoride 402 (in grams) that is mixed with the volume of hydrofluoric acid 404 (in milliliters) may be a ratio of one. For example, ten grams of potassium bifluoride 402 may be mixed in ten milliliters of 48% by weight hydrofluoric acid 404. Alternatively, a different ratio or amount of potassium bifluoride 402 and/or hydrofluoric acid 404 may be used, such as a ratio of less than one, a ratio of at least 0.5 and no more than 1.5, or another ratio.

At 208, the potassium bifluoride solution is mixed into the solution of potassium hexafluoromanganate. For example, the potassium hexafluoromanganate solution prepared at 202 (and after the insoluble magnesium fluoride is removed) may be stirred while the potassium bifluoride solution obtained at 206) is added to the potassium hexafluoromanganate solution obtained at 206.

The addition of the potassium bifluoride solution to the potassium hexafluoromanganate solution decreases the solubility of the potassium hexafluoromanganate in the solution. This reduction of solubility crystallizes or recrystallizes the potassium hexafluoromanganate filtrate without the impurities previously present in the potassium hexafluoromanganate. The recrystallization allows for the potassium hexafluoromanganate to be removed from the solution while the more soluble impurities to remain in the solution. As a result, the potassium hexafluoromanganate is purified of impurities that are more soluble in the solution.

At 210, the combined solution of the potassium bifluoride and the potassium hexafluoromanganate solution is filtered, such as by vacuum filtering the combined solution through a paper filter or other filter. The filtrate that is obtained from the combined solution is purified potassium hexafluoromanganate. This filtrate is free of or has significantly reduced amounts of impurities relative to the potassium hexafluoromanganate used to create the solution at 202. At 212, the filtrate is washed, such as by immersing or submerging the filtrate in a solvent such as acetone. In one embodiment, the filtrate is washed with four portions, or four separate times, in enough acetone to submerge the filtrate.

At 214, the washed filtrate is dried. For example, the filtrate may be placed in a vacuum desiccator and dried. The dried filtrate constitutes the purified potassium hexafluoromanganate. This purified potassium hexafluoromanganate is free of impurities, or has substantially fewer impurities than the potassium hexafluoromanganate used to create the solution at 202. For example, the purified potassium hexafluoromanganate may have no more than six parts per million of each of one or more Group 13 elements, such as aluminum, while the potassium hexafluoromanganate used to create the solution at 202 may have more than this amount of the Group 13 elements, such as at least 13, at least 17, or at least 36 parts per million of aluminum. Optionally, the purified potassium hexafluoromanganate may have no more than three parts per million of each of one or more Group 13 elements, such as aluminum.

Additionally or alternatively, the purified potassium hexafluoromanganate may have no more than 520 parts per million of each of one or more alkaline earth metals, such as calcium, while the potassium hexafluoromanganate used to create the solution at 202 may have more than this amount of the alkaline earth metals. Optionally, the purified potassium hexafluoromanganate may have no more than 260 parts per million of each of one or more alkaline earth metals, such as calcium Additionally or alternatively, the purified potassium hexafluoromanganate may have no more than fourteen parts per million of each of one or more transition metals, such as iron, copper, chromium, platinum, zirconium, nickel, vanadium, cobalt, and/or titanium, while the potassium hexafluoromanganate used to create the solution at 202 may have more than this amount of the transition metals. Optionally, the purified potassium hexafluoromanganate may have no more than seven parts per million of each of these one or more transition metals.

For example, the purified potassium hexafluoromanganate may have no more than ten parts per million of chromium while the potassium hexafluoromanganate prior to the purification may include a greater amount of chromium. Optionally, the purified potassium hexafluoromanganate may have no more than five parts per million of chromium. As another example, the purified potassium hexafluoromanganate may have no more than four parts per million of copper while the potassium hexafluoromanganate prior to the purification may include at least fourteen, at least 547, or at least 680 parts per million of copper. Optionally, the purified potassium hexafluoromanganate may have no more than two parts per million of copper.

The method 200 described above includes recrystallizing the potassium hexafluoromanganate. One or more additional or alternate techniques may be used to crystallize or recrystallize the potassium hexafluoromanganate from the solution while the impurities remain in the solution to purify the potassium hexafluoromanganate. The techniques described herein may be used in combination with each other.

In one embodiment, the method 200 recrystallizes the potassium hexafluoromanganate to remove the impurities from the potassium hexafluoromanganate by mixing the potassium hexafluoromanganate in the hydrofluoric acid (e.g., at 202) at an elevated temperature. This elevated temperature is a temperature above room temperature, such as approximately seventy degrees Celsius. This elevated temperature may be between sixty-eight and seventy-two degrees Celsius, between sixty-five and seventy-five degrees Celsius, or another range of temperatures. Then, in addition to or instead of adding the potassium containing solution to the potassium hexafluoromanganate solution, the potassium hexafluoromanganate solution can be cooled. The potassium hexafluoromanganate solution can be cooled by placing the container holding the solution in a bath formed by water and ice (e.g., an ice bath) or by otherwise exposing the solution to a temperature that is approximately zero degrees Celsius (e.g., between negative twenty and twenty degrees Celsius, between negative ten and ten degrees Celsius, between negative five and five degrees Celsius, or at another temperature that is cooler than the elevated temperature at which the potassium hexafluoromanganate is mixed into the hydrofluoric acid. This reduction in temperature can reduce the solubility of the potassium hexafluoromanganate in the solution (relative to the impurities being removed) such that, when the solution is filtered (e.g., at 208), the impurities or most of the impurities may remain in the solution while the purified potassium hexafluoromanganate is removed from the solution.

Additionally or alternatively, the method 200 recrystallizes the potassium hexafluoromanganate to remove the impurities from the potassium hexafluoromanganate by adding an antisolvent to the potassium hexafluoromanganate solution. The antisolvent may be added to the solution prepared at 202 in order to reduce the solubility of the potassium hexafluoromanganate in the solution so that the potassium hexafluoromanganate, and not the impurities, are filtered out of the solution (e.g., at 208). The antisolvent that is added can include carboxylic acids, ketones, or alcohols, or another material that reduces the solubility of the potassium hexafluoromanganate in the solution.

The purified potassium hexafluoromanganate may then be used to create one or more phosphor materials, such as potassium hexafluorosilicate. In one embodiment, the phosphor precursor may be treated as described in U.S. Pat. No. 8,252,613 or U.S. Patent Application Publication No. 2015/0054400, with a concentrated solution of a compound of formula II in aqueous hydrofluoric acid:

$$A^1_x[MF_y] \qquad (II)$$

where $A^1$ represents H, Li, Na, K, Rb, Cs, or a combination thereof; M represents Si, Ge, Sn, Ti, Zr, Al, Ga, In, Sc, Y, La, Nb, Ta, Bi, Gd, or a combination thereof; x is the absolute value of the charge of the $[MF_y]$ ion; and y has a value of 5, 6, or 7.

The compound of formula II includes at least the $MF_y$ anion of the host compound for the product phosphor, and may also include the $A^+$ cation of the compound of formula I. For a product phosphor of formula Mn-doped $K_2SiF_6$, suitable materials for the compound of formula II include $H_2SiF_6$, $Na_2SiF_6$, $(NH_4)_2SiF_6$, $Rb_2SiF_6$, $Cs_2SiF_6$, or a combination thereof, particularly $H_2SiF_6$, $K_2SiF_6$ and combinations thereof, more particularly $K_2SiF_6$. The treatment solution is a saturated or nearly saturated of the compound of formula II in hydrofluoric acid. A nearly saturated solution contains about 1-5% excess aqueous HF added to a saturated solution. Concentration of HF in the solution ranges from about 25% (wt/vol) to about 70% (wt/vol), in particular from about 40% (wt/vol) to about 50% (wt/vol). Less concentrated solutions may result in reduced performance of the phosphor. The amount of treatment solution used ranges from about 2-30 ml/g product, particularly about 5-20 ml/g product, more particularly about 5-15 ml/g product.

In one embodiment, the phosphor may be contacted with a fluorine-containing oxidizing agent at an elevated temperature that ranges from about 200° C. to about 700° C., particularly from about 350° C. to about 600° C. during contact, and in some embodiments from about 200° C. to about 700° C. Optionally, the temperature is at least 100° C., particularly at least 225° C., and more particularly at least 350° C. The phosphor precursor is contacted with the oxidizing agent for a period of time sufficient to convert it to a color stable phosphor. Time and temperature are interrelated, and may be adjusted together, for example, increasing time while reducing temperature, or increasing temperature while reducing time. In particular embodiments, the time is at least one hour, particularly for at least four hours, more particularly at least six hours, and most particularly at least eight hours. In a specific embodiment, the precursor is contacted with the oxidizing agent for a period of at least eight hours and a temperature of at least 250° C., for example, at about 250° C. for about four hours and then at a temperature of about 350° C. for about four hours.

The fluorine-containing oxidizing agent may be $F_2$, HF, $SF_6$, $BrF_5$, $NH_4HF_2$, $NH_4F$, KF, $AlF_3$, $SbF_5$, $C_1F_3$, $BrF_3$, KrF, $XeF_2$, $XeF_4$, $NF_3$, $SiF_4$, $PbF_2$, $ZnF_2$, $SnF_2$, $CdF_2$ or a combination thereof. In particular embodiments, the fluorine-containing oxidizing agent is $F_2$. The amount of oxidizing agent in the atmosphere may be varied to obtain the color stable phosphor, particularly in conjunction with variation of time and temperature. Where the fluorine-containing oxidizing agent is $F_2$, the atmosphere may include at least 0.5% $F_2$, although a lower concentration may be effective in some embodiments. In particular, the atmosphere may include at least 5% $F_2$ and more particularly at least 20% $F_2$. The atmosphere may additionally include nitrogen, helium, neon, argon, krypton, xenon, in any combination with the fluorine-containing oxidizing agent. In particular embodiments, the atmosphere is composed of about 20% $F_2$ and about 80% nitrogen.

The manner of contacting the precursor with the fluorine-containing oxidizing agent is not critical and may be accomplished in any way sufficient to convert the precursor to a color stable phosphor having the desired properties. In some embodiments, the chamber containing the precursor may be dosed and then sealed such that an overpressure develops as the chamber is heated, and in others, the fluorine and nitrogen mixture is flowed throughout the anneal process ensuring a more uniform pressure. In some embodiments, an additional dose of the fluorine-containing oxidizing agent may be introduced after a period of time.

The phosphor may be washed with one or more solvents to remove HF and unreacted raw materials. Suitable materials for the wash solvent include acetic acid and acetone, and combinations thereof.

The phosphor materials are used to form phosphors included in one or more various lighting apparatuses or lighting devices. The phosphors created based on or using the purified potassium hexafluoromanganate may have greater quantum efficiencies and/or operate for longer due to the absence of the impurities described herein. These impurities can decrease the quantum efficiencies and/or decrease the useful lives of the phosphors created using less pure potassium hexafluoromanganate.

Figure 5:
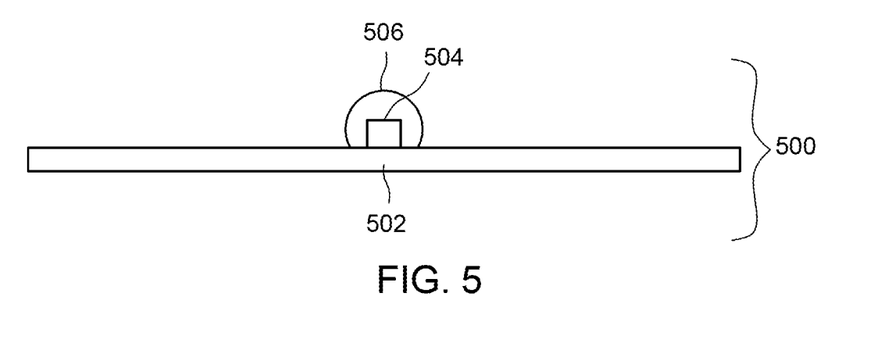
FIG. 5 illustrates one example of a lighting apparatus.
Figure 6:
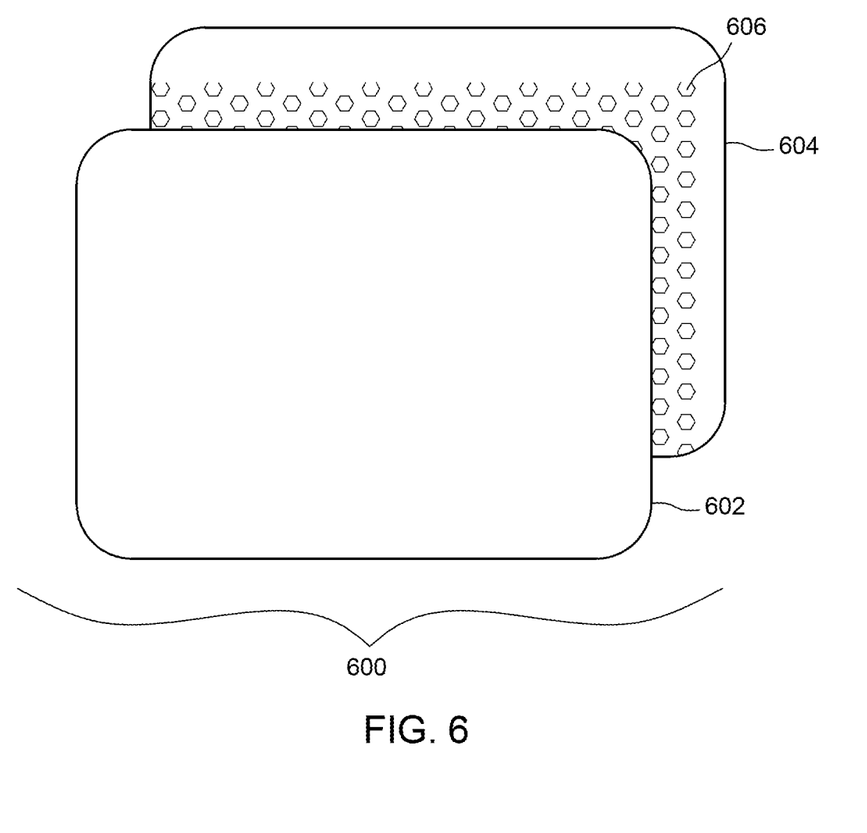
FIG. 6 illustrates an example of an electronic device.

For example, a phosphor may include or be formed from potassium hexafluorosilicate that was created using or based on potassium hexafluoromanganate purified as described herein. FIG. 5 illustrates one example of a lighting apparatus 500. The lighting apparatus 500 includes a substrate 502, such as a circuit board, to which a semiconductor-based light device is coupled. The semiconductor-based light device includes a light source 504 radiationally coupled with a phosphor 506. The light source 504 may be a light emitting diode or other type of light source. The phosphor 506 may include or be formed from a material derived or created from purified potassium hexafluoromanganate, such as potassium hexafluorosilicate created from potassium hexafluoromanganate purified using one or more embodiments of the inventive subject matter described herein. FIG. 6 illustrates an example of an electronic device 600. The electronic device 600 can represent an electronic display, such as a liquid crystal display (LCD) having an LCD screen 602 and an LED backlight unit 604. The backlight unit 604 includes several light sources 606, such as several LEDs radiationally coupled with the phosphors 506 described above.

The inventive subject matter described herein provides a purer feedstock for phosphor synthesis based on potassium hexafluoromanganate. The process removes impurities remaining in the potassium hexafluoromanganate from synthesis of the potassium hexafluoromanganate, including but not limited to excess potassium fluoride (KF) from solid state synthesis, unwanted compounds of other manganese oxidation states (e.g., $K_2MnF_5$, $K_2MnF_7$, $MnF_2$, $MnF_3$ etc.), metal contamination (platinum, copper, or other metals) from the furnace or furnace trays (e.g., used in solid state synthesis of potassium hexafluoromanganate) or electrodes (e.g., used in the electrolysis method of synthesizing potassium hexafluoromanganate), and extraneous contaminants or impurities in incoming raw materials. Purification of the potassium hexafluoromanganate leads to better performing phosphors, as the removal of impurities helps to improve quantum efficiency and reliability of the phosphors by decreasing the defects or imperfections in the material used to create the phosphors and reducing the probability of non-radiative energy losses and concentration quenching.

In one embodiment, a potassium hexafluoromanganate ($K_2MnF_6$) composition is provided. The composition includes no more than six parts per million of each of one or more Group 13 elements, no more than 520 parts per million of one or more alkaline earth metals, no more than fourteen parts per million of one or more transition metals, and/or no more than forty parts per million of calcium.

In one example, the one or more Group 13 elements is aluminum.

In one example, the one or more transition metals is one or more of iron, copper, chromium, zirconium, nickel, platinum, vanadium, cobalt, and/or titanium.

In one example, the one or more transition metals is iron.

In one example, the one or more transition metals is platinum.

In one example, the one or more transition metals is copper and the potassium hexafluoromanganate includes no more than four parts per million of the copper. Optionally, the potassium hexafluoromanganate includes no more than two parts per million of the copper.

In one example, the one or more transition metals is chromium and the potassium hexafluoromanganate includes no more than ten parts per million of the chromium. Optionally, the potassium hexafluoromanganate includes no more than five parts per million of the chromium.

In one example, the one or more transition metals is nickel and the potassium hexafluoromanganate includes no more than ten parts per million of the nickel. Optionally, the potassium hexafluoromanganate includes no more than five parts per million of the nickel.

In one example, the one or more transition metals is zirconium and the potassium hexafluoromanganate includes no more than six parts per million of the zirconium. Optionally, the potassium hexafluoromanganate includes no more than three parts per million of the zirconium.

In one example, the potassium hexafluoromanganate composition is free of vanadium, cobalt, titanium, lithium, and magnesium.

In one embodiment, a lighting apparatus is provided that includes a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, a backlight unit is provided that includes a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, an electronic device is provided that includes a backlight unit including a phosphor formed from the potassium hexafluoromanganate composition that includes no more than six parts per million of each of one or more Group 13 elements, no more than 520 parts per million of one or more alkaline earth metals, no more than fourteen parts per million of one or more transition metals, and/or no more than forty parts per million of calcium.

In one embodiment, a method includes obtaining a first solution comprising potassium hexafluoromanganate ($K_2MnF_6$) and one or more impurities, filtering the first solution of the potassium hexafluoromanganate and the one or more impurities to form a filtrate, and separating the potassium hexafluoromanganate from the one or more impurities by crystallizing the filtrate.

In one example, filtering the first solution of the potassium hexafluoromanganate and the one or more impurities includes vacuum filtering the first solution through one or more filter bodies to form the filtrate.

In one example, separating the potassium hexafluoromanganate from the one or more impurities includes cooling the filtrate.

In one example, separating the potassium hexafluoromanganate from the one or more impurities includes saturating the filtrate at an elevated temperature and subsequently cooling the filtrate.

In one example, separating the potassium hexafluoromanganate from the one or more impurities includes adding a second solution of one or more of potassium fluoride (KF) or potassium bifluoride ($KHF_2$) in hydrofluoric acid (HF) to the filtrate, and vacuum filtering the filtrate in the second solution through one or more filter bodies.

In one example, separating the potassium hexafluoromanganate from the one or more impurities includes adding an antisolvent to the filtrate.

In one example, the antisolvent is one or more of acetic acid or acetone.

In one example, obtaining the first solution includes dissolving the potassium hexafluoromanganate and the one or more impurities into hydrofluoric acid.

In one example, obtaining the first solution of the potassium hexafluoromanganate and the one or more impurities includes precipitating the potassium hexafluoromanganate and the one or more impurities from a third solution formed from potassium permanganate ($KMnO_4$), one or more of potassium fluoride (KF) or potassium bifluoride ($KHF_2$), hydrofluoric acid (HF), and peroxide ($H_2O_2$).

In one example, obtaining the first solution of the potassium hexafluoromanganate and the one or more impurities includes reacting a combination of one or more of potassium fluoride (KF) or potassium bifluoride ($KHF_2$), manganese (II) fluoride ($MnF_2$), and fluorine.

In one example, obtaining the first solution of the potassium hexafluoromanganate and the one or more impurities includes precipitating the potassium hexafluoromanganate and the one or more impurities using electrolysis.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

The limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method comprising:
   obtaining a first solution comprising potassium hexafluoromanganate ($K_2MnF_6$) and one or more impurities, wherein the first solution is prepared at an elevated temperature in a range of between sixty-five and seventy-five degrees Celsius;
   filtering the first solution of the potassium hexafluoromanganate and the one or more impurities to form a filtrate; and
   separating the potassium hexafluoromanganate from the one or more impurities by crystallizing the filtrate, wherein separating the potassium hexafluoromanganate from the one or more impurities comprises crystallizing the filtrate by:
adding a potassium containing solution to the filtrate to form a second solution; and
cooling the second solution by exposing the second solution to a temperature less than the elevated temperature;
and
wherein the crystallized filtrate of potassium hexafluoromanganate has no more than forty parts per million of calcium.

2. The method of claim 1, wherein filtering the first solution of the potassium hexafluoromanganate and the one or more impurities includes vacuum filtering the first solution through one or more filter bodies to form the filtrate.

3. The method of claim 1, wherein obtaining the first solution includes dissolving the potassium hexafluoromanganate and the one or more impurities into hydrofluoric acid.

* * * * *